UNITED STATES PATENT OFFICE.

JOSEPHINE LAVAL, OF ALLEGHENY, PENNSYLVANIA.

AMALGAM FOR USE IN COATING GLASS TO FORM MIRRORS.

No. 892,435.     Specification of Letters Patent.     Patented July 7, 1908.

Application filed January 30, 1907, Serial No. 354,935. Renewed December 2, 1907. Serial No. 404,732.

*To all whom it may concern:*

Be it known that I, JOSEPHINE LAVAL, a citizen of the United States, residing at Allegheny, in the county of Allegheny and State of Pennsylvania, have invented new and useful Improvements in Amalgams for Use in Coating Glass to Form Mirrors, of which the following is a specification.

This invention relates to amalgam for coating glass in the production of mirrors. The amalgam is in the nature of an alloy, but when applied as hereinafter specified is advantageous by reason of superiority in brilliancy and more perfect reflection. Furthermore, the amalgam is advantageous in its use when compared with chemical processes of silvering or coating glass as heretofore practiced in that it does not turn yellow or peel off if subjected to the action of the sun or heat, and will not tarnish or streak from dampness.

The amalgam consists of:

Metallic antimony____ five parts.
Bar lead _____ twenty parts.
Pure tin—in bars ____ twenty parts.
Mercury_____ fifteen parts.

The foregoing proportions may be varied to meet certain requirements, but for general usage the specific quantities mentioned have been found to be successful in arriving at the result sought.

In mixing the several metals above mentioned the metallic antimony is disposed in a crucible and subjected to a heat of about 850° F., and when melted the pure lead is added and the mass throroughly stirred. While the antimony and lead are in a heated and melted condition, the tin in pure form is then placed in the crucible, and when the whole is well fused it is allowed to cool to a lower temperature, say about 450° F. When the antimony, lead and tin have reached the latter temperature, the mercury is added and thoroughly mixed with the other metals. The amalgam, while in melted or liquid condition, is applied to the glass, and the method of mixing the several metals, as just explained, is effective in bringing the different ingredients into intimate association or relation and in maintaining permanency of the coating on the glass to overcome the deficiencies heretofore experienced in pursuing chemical processes or methods of coating or silvering.

The amalgam may be applied to the glass by any suitable means or machine, said amalgam being maintained in a heated or melted condition and fed or delivered to the glass to be covered in a fluid state. Owing to the nature of the amalgam, a quick drying action ensues with material advantages from a commercial standpoint, in that the glass may be covered and prepared for shipment in a comparatively short time and without liability of injuring the covering of amalgam, which rapidly hardens, and is of such durable nature as to resist scratching and overcome other objections existing in the use of ordinary amalgam coverings such for instance, peeling or scaling. Furthermore, the ordinary amalgam or silvering used on glass requires a backing, in many instances of some other material This extra coating is unnecessary in applying the improved amalgam embodying the features of this invention.

There are at present many combinations of metals or alloys comprising some of the component parts of the amalgam embodying the features of this invention, but, so far as known, there is none that uses the same combination of metals. The present amalgam is more economical in its use and replaces the chemical or nitrate of silver process.

Having thus described the invention, what is claimed, is:

An amalgam for use in coating glass to form mirrors, consisting of five parts of metallic antimony, twenty parts of bar lead, twenty parts of pure tin, and fifteen parts of mercury.

In testimony whereof I have hereunto set my hand in presence of two subscribing witnesses.

JOSEPHINE LAVAL.

Witnesses:
   EUGÉNE W. LANGENEGER, Jr.,
   MATHILDE PRUNEAU.